(12) United States Patent
Lee (10) Patent No.: US 11,858,432 B1
(45) Date of Patent: Jan. 2, 2024

(54) IDENTIFICATION DISPLAY BAG WITH CAMERA SYSTEM

(71) Applicant: David Lee, Lanham, MD (US)

(72) Inventor: David Lee, Lanham, MD (US)

(*) Notice: Subject to any disclaimer, the term of this patent is extended or adjusted under 35 U.S.C. 154(b) by 140 days.

(21) Appl. No.: 17/694,842

(22) Filed: Mar. 15, 2022

(51) Int. Cl.
| | | |
|---|---|---|
| *B60R 13/10* | (2006.01) | |
| *B60R 7/08* | (2006.01) | |
| *B60R 9/02* | (2006.01) | |
| *B60R 1/04* | (2006.01) | |

(52) U.S. Cl.
CPC .............. *B60R 13/105* (2013.01); *B60R 1/04* (2013.01); *B60R 7/08* (2013.01); *B60R 9/02* (2013.01)

(58) Field of Classification Search
CPC ......... B60R 13/105; B60R 9/02; B60R 11/04; B60R 2011/004; B60R 7/08; G08B 13/19602; G08B 13/19617; G08G 1/0175; G08G 1/054
USPC ...... 248/475.1, 683, 467, 206.5, 309.4, 914; 40/591, 643, 658; 24/336, 349, 563; 396/25, 27, 56, 153, 297, 310, 427
See application file for complete search history.

(56) References Cited

U.S. PATENT DOCUMENTS

| | | | | |
|---|---|---|---|---|
| 3,237,327 A | * | 3/1966 | Griggs .................... | G09F 3/18 211/DIG. 1 |
| 3,425,539 A | * | 2/1969 | Otakar .................... | B60N 3/08 224/543 |
| 4,736,853 A | * | 4/1988 | O'Mara ................ | B43K 23/001 211/DIG. 1 |
| 5,262,813 A | * | 11/1993 | Scharton ................ | B60R 1/12 396/502 |
| 5,595,300 A | * | 1/1997 | Paik .................... | B65D 83/0805 248/230.8 |
| 5,850,957 A | * | 12/1998 | Morris .................... | B60R 11/00 224/555 |
| 6,630,884 B1 | * | 10/2003 | Shanmugham ...... | G07C 5/0891 340/436 |
| 6,676,308 B2 | * | 1/2004 | Baek ...................... | B60R 11/04 348/148 |
| 7,245,207 B1 | * | 7/2007 | Dayan ................ | B60R 11/0235 348/148 |
| 7,325,349 B2 | * | 2/2008 | Becker .................... | G09F 3/207 24/336 |

(Continued)

FOREIGN PATENT DOCUMENTS

WO  2018017706  1/2018

*Primary Examiner* — Terrell L McKinnon
*Assistant Examiner* — Michael McDuffie
(74) *Attorney, Agent, or Firm* — Kyle A. Fletcher, Esq.

(57) ABSTRACT

The identification display bag with camera system comprises a document pouch and a camera. The document pouch may be detachably coupled to the outside of a vehicle and may be adapted to hold one or more identification documents for inspection by a law enforcement officer during a traffic stop. The camera may record video and/or audio during the traffic stop. The identification display bag with camera system may be adapted to allow a driver to keep the driver's hands visible on a steering wheel to establish a safe environment for both the driver and the law enforcement officer. The law enforcement officer may observe that the driver is not reaching for a weapon and the law enforcement officer may be less likely to react to a perceived threat. The video and/or the audio may be available for review after the traffic stop, if necessary.

20 Claims, 4 Drawing Sheets

(56) References Cited

U.S. PATENT DOCUMENTS

| | | | |
|---|---|---|---|
| 7,413,357 B2* | 8/2008 | Badalian | G08B 13/19619 |
| | | | 396/433 |
| 7,527,170 B2* | 5/2009 | Slocum | B60R 11/00 |
| | | | 221/45 |
| 7,571,560 B2* | 8/2009 | Peterman | G09F 3/203 |
| | | | 40/643 |
| 7,991,274 B2* | 8/2011 | Kawakami | G03B 17/08 |
| | | | 348/81 |
| 10,272,848 B2* | 4/2019 | Troxel | H04N 7/188 |
| 10,501,024 B1* | 12/2019 | Albright | B60R 9/02 |
| D878,925 S | 3/2020 | McGrath | |
| 10,640,049 B1* | 5/2020 | Daniels | B60R 11/00 |
| 10,766,436 B2 | 7/2020 | Simmons | |
| 10,912,360 B2* | 2/2021 | Spector | F16B 1/00 |
| 10,992,966 B2 | 4/2021 | Bennett | |
| 11,049,425 B2 | 6/2021 | Guillory | |
| 2009/0174774 A1* | 7/2009 | Kinsley | B60R 1/00 |
| | | | 348/148 |
| 2015/0048132 A1* | 2/2015 | Stein | B60R 7/04 |
| | | | 224/483 |
| 2016/0239713 A1 | 8/2016 | Stone | |
| 2018/0151093 A1 | 5/2018 | Willis | |
| 2019/0077325 A1 | 3/2019 | Boukari | |
| 2020/0294164 A1 | 6/2020 | Redmon | |

\* cited by examiner

IDENTIFICATION DISPLAY BAG WITH CAMERA SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of identification systems and surveillance systems, more specifically, an identification display bag with camera system.

SUMMARY OF INVENTION

The identification display bag with camera system comprises a document pouch and a camera. The document pouch may be detachably coupled to the outside of a vehicle and may be adapted to hold one or more identification documents for inspection by a law enforcement officer during a traffic stop. The camera may record video and/or audio during the traffic stop. The identification display bag with camera system may be adapted to allow a driver to keep the driver's hands visible on a steering wheel to establish a safe environment for both the driver and the law enforcement officer. The law enforcement officer may observe that the driver is not reaching for a weapon and the law enforcement officer may be less likely to react to a perceived threat. The video and/or the audio may be available for review after the traffic stop, if necessary.

An object of the invention is to present one or more identification documents to a law enforcement office during a traffic stop.

Another object of the invention is to provide a pouch that magnetically couples to the side of to vehicle for displaying the identification documents.

A further object of the invention is to provide a camera for recording video and audio of the traffic stop.

Yet another object of the invention is to a wireless communication interface for communication between an application program executing on a smart phone and the camera for initiating and terminating camera operation and for transmitting captured video and audio from the camera to the smart phone.

These together with additional objects, features and advantages of the identification display bag with camera system will be readily apparent to those of ordinary skill in the art upon reading the following detailed description of the presently preferred, but nonetheless illustrative, embodiments when taken in conjunction with the accompanying drawings.

In this respect, before explaining the current embodiments of the identification display bag with camera system in detail, it is to be understood that the identification display bag with camera system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the identification display bag with camera system.

It is therefore important that the claims be regarded as including such equivalent construction insofar as they do not depart from the spirit and scope of the identification display bag with camera system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
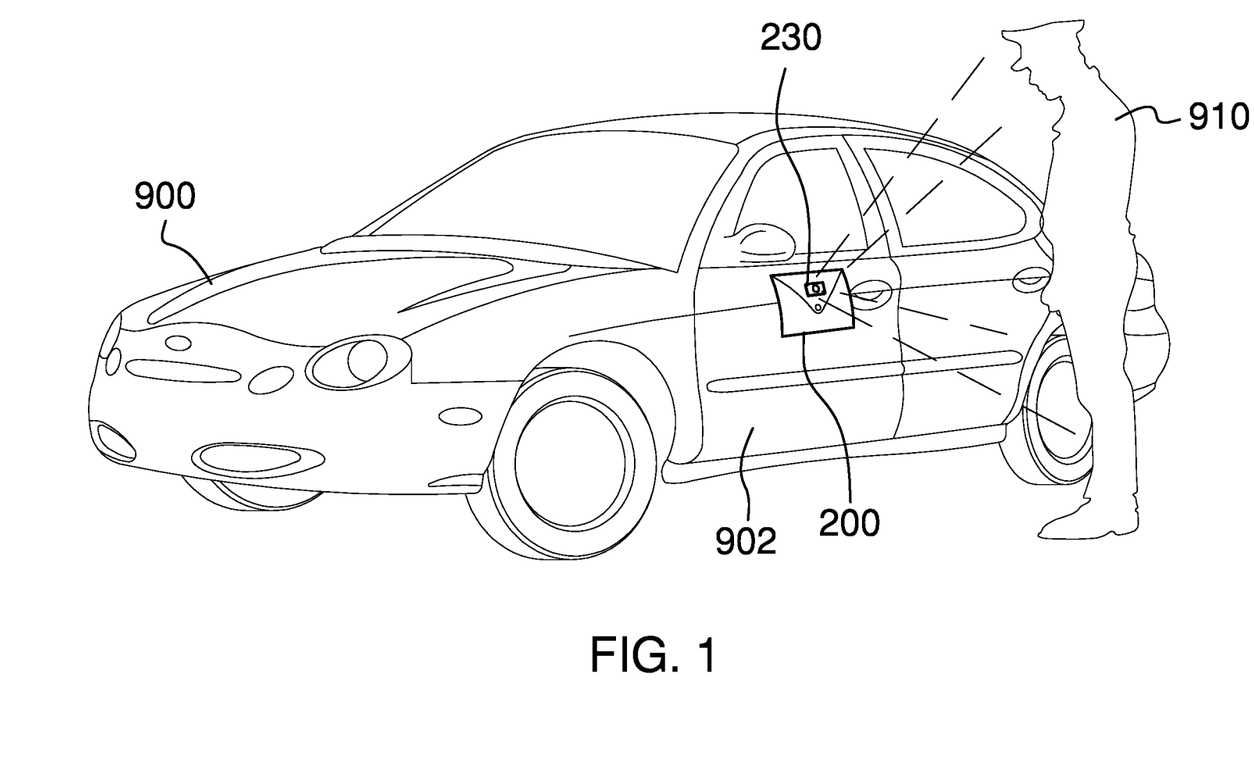
FIG. 1 is an in-use view of an embodiment of the disclosure.
Figure 2:
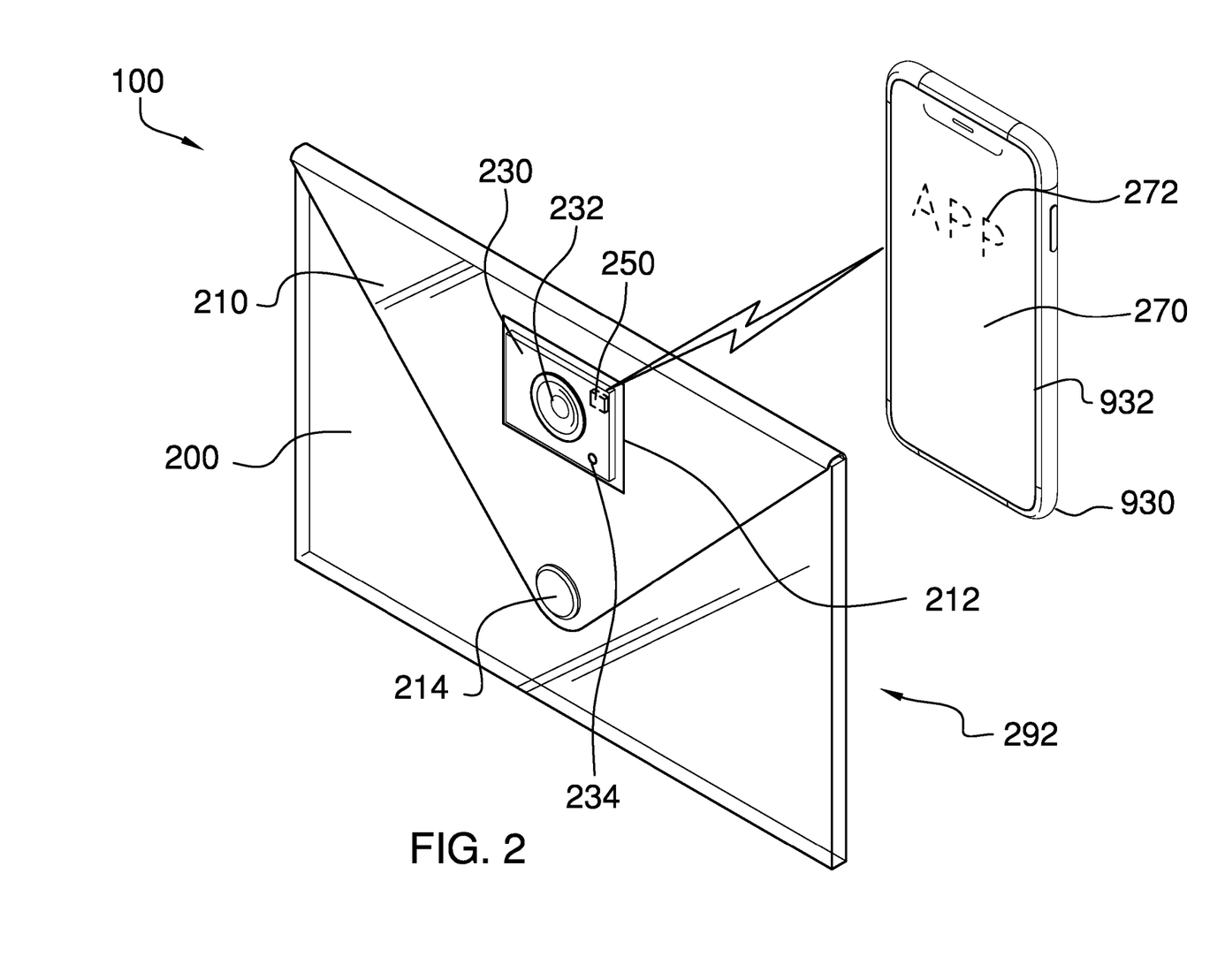
FIG. 2 is an isometric view of an embodiment of the disclosure.
Figure 3:
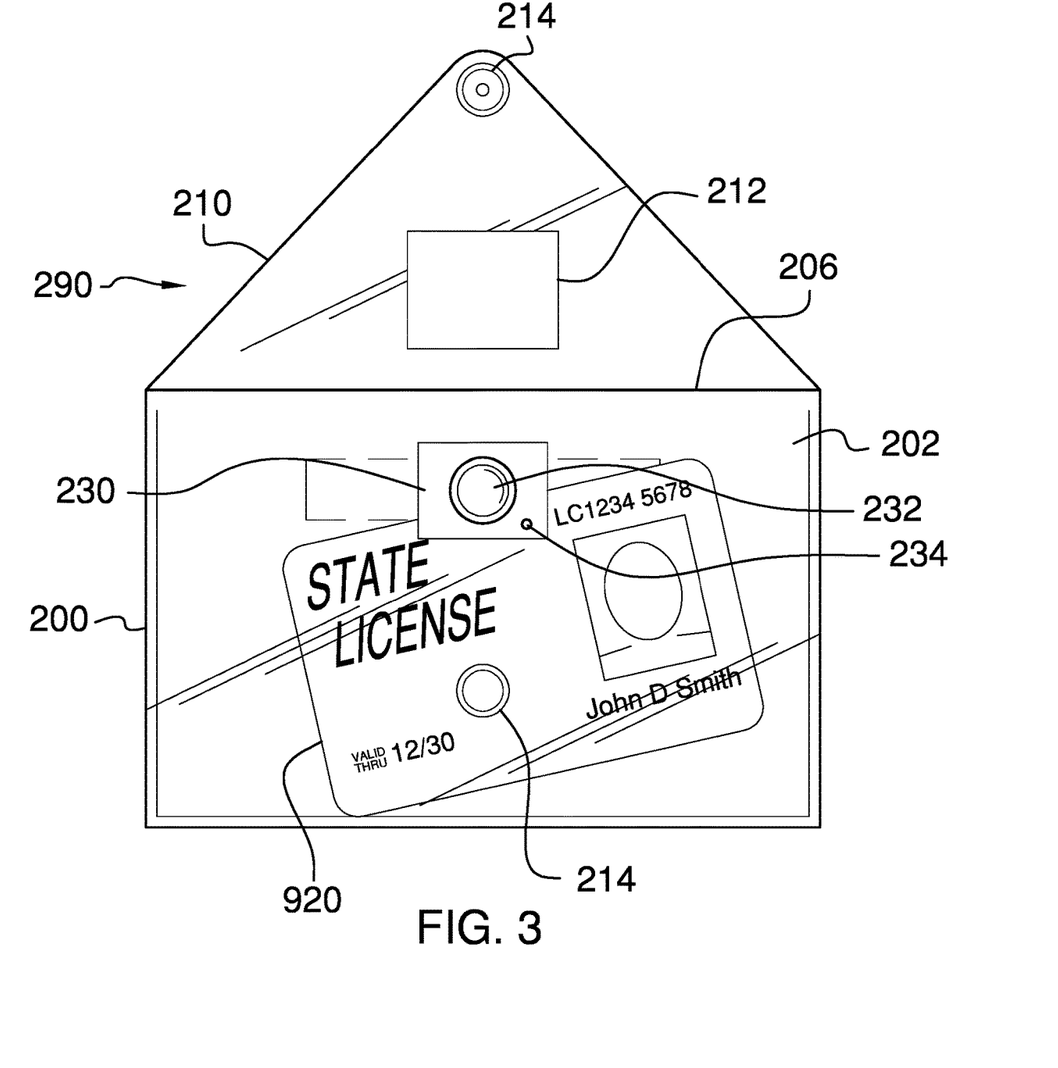
FIG. 3 is a front view of an embodiment of the disclosure.
Figure 4:
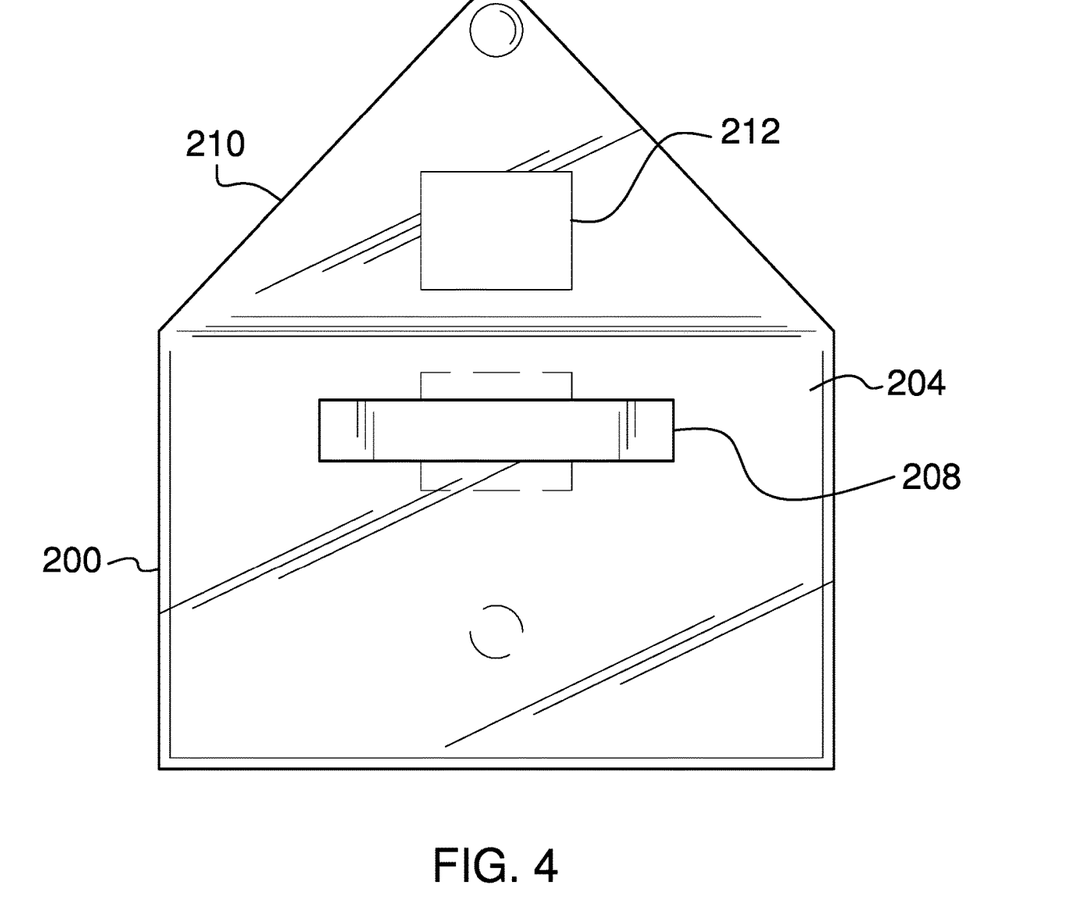
FIG. 4 is a rear view of an embodiment of the disclosure.

Detailed reference will now be made to a first potential embodiment of the disclosure, which is illustrated in FIGS. 1 through 4.

The identification display bag with camera system 100 (hereinafter invention) comprises a document pouch 200 and a camera 230. The document pouch 200 may be detachably coupled to the outside of a vehicle 900 and may be adapted to hold one or more identification documents 920 for inspection by a law enforcement officer 910 during a traffic stop. The camera 230 may record video and/or audio during the traffic stop. The invention 100 may be adapted to allow a driver to keep the driver's hands visible on a steering wheel to establish a safe environment for both the driver and the law enforcement officer 910. The law enforcement officer 910 may observe that the driver is not reaching for a weapon and the law enforcement officer 910 may be less likely to react to a perceived threat. The video and/or the audio may be available for review after the traffic stop, if necessary.

The document pouch 200 may be a clear container for the one or more identification documents 920 that the driver may be required to show during the course of the traffic stop. As non-limiting examples, the one or more identification documents 920 may comprise a driver's license and/or a registration card. The one or more identification documents 920 may be placed into the hollow interior of the document pouch 200 through a top aperture 206. Both the front and back sides of the one or more identification documents 920 may be visible through a front side 202 and a rear side 204 of the document pouch 200, respectively.

The rear side 204 of the document pouch 200 may comprise a magnet 208 located on the outside of the document pouch 200. The magnet 208 may be operable to retain the document pouch 200 on the side of the vehicle 900. As non-limiting examples, the document pouch 200 may be adapted to be placed onto a driver side door 902 by the driver or onto a passenger side door by a passenger.

The document pouch 200 may comprise a flap 210 that may be operable to cover the top aperture 206. The flap 210 may be hingedly coupled to the top of the rear side 204 of the document pouch 200 and may be pivoted forward to cover the top aperture 206 and hang down over the front side 202 of the document pouch 200. The flap 210 may be moved to an open position 290 to reveal the top aperture 206 for inserting or removing the one or more identification documents 920. The flap 210 may be moved to a closed position 292 to retain the one or more identification documents 920 within the document pouch 200.

The flap 210 may comprise a camera aperture 212. The camera aperture 212 may be an opening in the flap 210 to assure that the camera 230 is not covered by the flap 210. The camera aperture 212 may be positioned on the flap 210 to align with the camera 230 which may be coupled to the front side 202 of the document pouch 200.

The document pouch 200 may comprise a clasp 214. The clasp 214 may be a fastener that may be operable to hold the flap 210 closed. As a non-limiting example, one half of the clasp 214 may be coupled to the front side 202 of the document pouch 200 and the other half of the clasp 214 may be coupled to the inside of the flap 210 such that the two halves of the clasp 214 align when the flap 210 is closed. The document pouch 200 may be water resistant to protect the one or more identification documents 920 from rain or other sources of moisture.

The camera 230 may be coupled to the front side 202 of the document pouch 200 such that the camera 230 aligns with the camera aperture 212 in the flap 210 when the flap 210 is in the closed position 292. The camera 230 may have an unobstructed view of an area adjacent to the vehicle 900 through the camera aperture 212. The camera 230 may be water resistant such that the camera 230 is not harmed by exposure to rain or other sources of moisture.

The camera 230 may comprise a lens 232 that is oriented to point away from the vehicle 900. In some embodiments, the lens 232 may be a wide angle lens. The camera 230 may comprise a microphone 234. The camera 230 may be operable to record the video and/or the audio that may chronicle events taking place during the traffic stop. The video may be converted into a digital representation of one or more images captured by an image sensor located within the camera 230. The audio may be converted into a digital representation of one or more sounds captured by the microphone 234. Digital representations of the images and sounds may be stored in one or more memory modules.

The camera 230 may comprise a wireless communication interface 250. As non-limiting examples, the wireless communication interface 250 may be based upon Bluetooth or BLE standards and protocols. The wireless communication interface 250 may be operable to communicate with an application program 270 executing on a smartphone 930.

The application program 270 may be operable to start and stop the recording of the video and/or the audio from a user interface 272 that may be presented on a display 932 of the smartphone 930. Alternatively, the camera 230 may be commanded to start and stop recording manually using controls that may be accessible on the camera 230.

The application program 270 may be operable to initiate the transfer of the digital representations of the images and sounds from the camera 230 to the smartphone 930. The digital representations of the images and sounds may be reproduced on the display 932 of the smartphone 930 using the display 932 and audio components of the smartphone 930. The digital representations of the images and sounds may be transmitted over one or more communication networks from the smartphone 930 to other electronic devices for archiving and/or playback. As non-limiting examples, the other electronic devices may comprise other smartphones, laptop computers, tablet computers, desktop computers, server computers, and any combination thereof.

In use, the driver may place one or more identification documents 920 into the document pouch 200 and the document pouch 200 may be detachably coupled to the driver side door 902 using the magnet 208 on the rear side 204 of the document pouch 200. As a non-limiting example, the one or more identification documents 920 may be placed into the document pouch 200 and the document pouch 200 may be placed on the driver side door 902 by the driver while waiting for the law enforcement officer 910 to walk to the vehicle 900 during the traffic stop. Documentation for the passengers may also be placed into the document pouch 200 in anticipation of the law enforcement officer 910 wanting to see the one or more identification documents 920 of the passengers. Alternatively, the document pouch 200, or a second document pouch, may be placed on a passenger side door by a passenger.

The camera 230 may be activated using either controls on the camera 230 or an application program 270 executing on a smartphone 930 that is in wireless communication with the camera 230. The driver and the passengers may place their hands high in front of them, for example on the steering wheel, dashboard, or a seatback, and may retain their hands in plain sight for the duration of the traffic stop.

The law enforcement officer 910 may examine the one or more identification documents 920 including, if necessary, removing the one or more identification documents 920 from the document pouch 200 and returning the one or more identification documents 920 to the document pouch 200 by the end of the traffic stop.

If necessary, the digital representations of the images and sounds chronicling the traffic stop may be transmitted from the camera 230 to the smartphone 930 where the digital representations of the images and sounds may be reviewed or forwarded.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface. Aperture may be synonymous with hole, slit, crack, gap, slot, or opening.

As used in this disclosure, "Bluetooth" may refer to a standardized communication protocol that is used to wirelessly interconnect electronic devices. Bluetooth® is a registered trademark of Bluetooth SIG.

As used herein, "BLE" may refer to Bluetooth low Energy. BLE is a wireless personal are network technology designed and promoted by Bluetooth SIG. BLE is intended to provide a communication range that is similar to Classic Bluetooth while consuming considerably less power. BLE and Classic Bluetooth are not compatible however they may coexist.

As used in this disclosure, a "camera" may be a sensor that converts light into electric signals that encode the spatial orientation of the captured light in a manner that reproduces the images seen by a human eye.

As used herein, the words "couple", "couples", "coupled" or "coupling", may refer to connecting, either directly or indirectly, and does not necessarily imply a mechanical connection.

As used in this disclosure, a "display" may be a surface upon which is presented an image, potentially including, but not limited to, graphic images and text, that is interpretable by an individual viewing the image. When used as a verb, "display" may be defined as presenting such an image.

As used in this disclosure, a "fastener" may be a device that is used to join or affix two objects. Fasteners may generally comprise a first element which is attached to the first object and a second element which is attached to the second object such that the first element and the second element join to affix the first object and the second object. Common fasteners may include, but are not limited to, hooks, zippers, snaps, clips, ties, buttons, buckles, quick release buckles, or hook and loop fasteners.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, an "image sensor" may receive light from the exterior of the image sensor and converts the received light into a digital representation of an image. The digital representation of the image may be stored electronically and/or may be transmitted electronically. One or more logic modules may convert the digital representation into signals that may drive an electronic display to reproduce a visual reproduction of the source of the captured light As used in this disclosure, the word "interior" may be used as a relational term that implies that an object is located or contained within the boundary of a structure or a space.

As used in this disclosure, a "lens" may be a transparent substance through which light can pass. A lens may or may not be formed with curved surfaces that are used to concentrate or disperse the light that travels through the lens.

As used in this disclosure, a "magnet" may be an ore, alloy, or other material that has its component atoms arranged so that the material exhibits properties of magnetism such as attracting iron-containing objects or aligning itself in an external magnetic field.

As used in this disclosure, a "microphone" may be a transducer that converts the energy from vibration into electrical energy. The sources of vibrations include, but are not limited to, acoustic energy.

As used herein, "smart phone" or "smartphone" may refer to a personal communication device that incorporates cellular phone calling and texting capabilities along with advanced features. Non-limiting examples of the advanced features of a smart phone may include camera functions, multimedia functions (such as music and video recording and playback and gaming), internet functions (such as web browsing and file uploading/downloading), and Global Positioning System capabilities. A smartphone may be able to execute downloaded application programs that expand the capabilities of the smartphone.

As used in this disclosure, "transparent" may refer to a material that allows light to pass through the material without significant scattering such that an object can be seen without distortion through the material. "Clear" may be considered to be both transparent and colorless.

As used herein, "vehicle" may refer to a device that is used for transporting passengers, goods, equipment, or combinations thereof.

As used herein, "water resistant" may refer to an object that is not harmed by incidental exposure to water but may be harmed if totally submerged. As non-limiting examples, incidental exposure to water may include exposure to raindrops, dew, and splashes from puddles.

As used herein, "wide angle lens" may refer to a lens having a viewing angle of 64 degrees or more. As a non-limiting example, for a camera using the 35 mm film format a lens having a focal length of 50 mm is considered to be a normal lens and a lens having a focal length in the range of 35 mm to 24 mm is considered to be a wide angle lens. A lens having a focal length of less than 24 mm may be referred to as an ultra-wide angle lens.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An identification display bag with camera system comprising:

A document pouch and a camera;

wherein the document pouch is detachably coupled to the outside of a vehicle and is adapted to hold one or more identification documents for inspection by a law enforcement officer during a traffic stop;

wherein the camera records video and/or audio during the traffic stop;

wherein the identification display bag with camera system is adapted to allow a driver to keep the driver's hands visible on a steering wheel to establish a safe environment for both the driver and the law enforcement officer;

wherein the video and/or the audio are available for review after the traffic stop.

2. The identification display bag with camera system according to claim 1 wherein the document pouch is a clear container for the one or more identification documents;

wherein the one or more identification documents are placed into the hollow interior of the document pouch through a top aperture;

wherein both the front and back sides of the one or more identification documents are visible through a front side and a rear side of the document pouch, respectively.

3. The identification display bag with camera system according to claim 2 wherein the rear side of the document pouch comprises a magnet located on the outside of the document pouch;

wherein the magnet is operable to retain the document pouch on the side of the vehicle.

4. The identification display bag with camera system according to claim 3 wherein the document pouch comprises a flap that is operable to cover the top aperture;

wherein the flap is hingedly coupled to the top of the rear side of the document pouch and is pivoted forward to cover the top aperture and hang down over the front side of the document pouch.

5. The identification display bag with camera system according to claim 4 wherein the flap is moved to an open position to reveal the top aperture for inserting or removing the one or more identification documents;

wherein the flap is moved to a closed position to retain the one or more identification documents within the document pouch.

6. The identification display bag with camera system according to claim 5 wherein the flap comprises a camera aperture;

wherein the camera aperture is an opening in the flap to assure that the camera is not covered by the flap;

wherein the camera aperture is positioned on the flap to align with the camera which is coupled to the front side of the document pouch.

7. The identification display bag with camera system according to claim 6 wherein the document pouch comprises a clasp;

wherein the clasp is a fastener that is operable to hold the flap closed.

8. The identification display bag with camera system according to claim 7 wherein one half of the clasp is coupled to the front side of the document pouch and the other half of the clasp is coupled to the inside of the flap such that the two halves of the clasp align when the flap is closed.

9. The identification display bag with camera system according to claim 8 wherein the document pouch is water resistant to protect the one or more identification documents from moisture.

10. The identification display bag with camera system according to claim 9 wherein the camera is coupled to the front side of the document pouch such that the camera aligns with the camera aperture in the flap when the flap is in the closed position;

wherein the camera has an unobstructed view of an area adjacent to the vehicle through the camera aperture.

11. The identification display bag with camera system according to claim 10 wherein the camera is water resistant such that the camera is not harmed by exposure to moisture.

12. The identification display bag with camera system according to claim 11 wherein the camera comprises a lens that is oriented to point away from the vehicle.

13. The identification display bag with camera system according to claim 12 wherein the lens is a wide angle lens.

14. The identification display bag with camera system according to claim 12 wherein the camera comprises a microphone;

wherein the camera is operable to record the video and/or the audio that chronicles events taking place during the traffic stop;

wherein the video is converted into a digital representation of one or more images captured by an image sensor located within the camera;

wherein the audio is converted into a digital representation of one or more sounds captured by the microphone;

wherein digital representations of the images and sounds are stored in one or more memory modules.

15. The identification display bag with camera system according to claim 14 wherein the camera comprises a wireless communication interface;

wherein the wireless communication interface is operable to communicate with an application program executing on a smartphone.

16. The identification display bag with camera system according to claim 15 wherein the application program is operable to start and stop the recording of the video and/or the audio from a user interface that is presented on a display of the smartphone.

17. The identification display bag with camera system according to claim 15 wherein the camera is commanded to start and stop recording manually using controls that are accessible on the camera.

18. The identification display bag with camera system according to claim 15 wherein the application program is operable to initiate the transfer of the digital representations of the images and sounds from the camera to the smartphone.

19. The identification display bag with camera system according to claim 18 wherein the digital representations of the images and sounds are reproduced on the display of the smartphone using the display and audio components of the smartphone.

20. The identification display bag with camera system according to claim 18 wherein the digital representations of the images and sounds are transmitted over one or more communication networks from the smartphone to other electronic devices for archiving and/or playback.

\* \* \* \* \*